United States Patent [19]

Kahilathi et al.

[11] Patent Number: 4,576,327
[45] Date of Patent: Mar. 18, 1986

[54] PROCEDURE FOR AFFIXING BEARING HOOPS ON OUTER SURFACE OF LARGE DIAMETER DRUM

[75] Inventors: Matti Kahilathi, Lahti; Keijo Ventola; Matti Virtanen, both of Kartano; Pentti Huhta, Salpakangas, all of Finland

[73] Assignee: Kone Oy, Helsinki, Finland

[21] Appl. No.: 622,542

[22] Filed: Jun. 20, 1984

[30] Foreign Application Priority Data

Jun. 20, 1983 [FI] Finland ................................ 832248

[51] Int. Cl.$^4$ ............................................ B23K 31/02
[52] U.S. Cl. ...................................... 228/212; 228/184; 29/447
[58] Field of Search ............... 228/144, 150, 151, 183, 228/184, 200, 212, 213, 48, 49.2; 384/476, 538, 549; 308/244; 269/48.1; 72/367, 368; 29/447

[56] References Cited

U.S. PATENT DOCUMENTS

| | | | |
|---|---|---|---|
| 2,267,339 | 12/1941 | Paulsen | 29/447 |
| 3,193,918 | 7/1965 | Heldenbrand | 29/447 |
| 3,439,856 | 4/1969 | Philipps et al. | 228/48 |
| 3,499,210 | 3/1970 | Schellstede et al. | 228/212 X |
| 3,739,443 | 6/1973 | Friedman | 29/447 |
| 3,774,296 | 11/1973 | Clay | 228/184 |
| 3,863,902 | 2/1975 | O'Brien et al. | 384/549 X |
| 3,950,043 | 4/1976 | Endersen | 384/549 X |
| 3,961,741 | 6/1976 | Klein | 228/144 |
| 4,406,151 | 9/1983 | Simonsen et al. | 269/48.1 |

FOREIGN PATENT DOCUMENTS 681254  8/1979  U.S.S.R. ............................ 384/476

Primary Examiner—Nicholas P. Godici
Assistant Examiner—M. Jordan
Attorney, Agent, or Firm—Martin Smolowitz

[57] ABSTRACT

A procedure for affixing bearing hoops on the outer surface of a barking drum or an equivalent large diameter drum, the bearing hoops resting on carrier wheels thereunder, by the aid of which the drum is rotated. In this procedure, a drum with an open longitudinal joint gap, the bearing hoops and the carrier wheels are properly placed in mutual register. The invention teaches to proceed in the manner that hollow bearing hoops are used through which a heating fluid, such as hot water, is arranged to flow, that the inner surface of the drum is cooled with a cooling fluid such as cold water, that the drum is loaded mechanically in a direction such as to dilate the longitudinal joint gap, that is, so that the drum is urged against the inner surface of the bearing hoop, that the drum is secured in this position by the aid of wedges pushed into the longitudinal joint, that into the open longitudinal joint of the drum inserts are welded, and that the bearing hoops are then allowed to cool.

11 Claims, 4 Drawing Figures

PROCEDURE FOR AFFIXING BEARING HOOPS ON OUTER SURFACE OF LARGE DIAMETER DRUM

BACKGROUND OF INVENTION

The present invention concerns a procedure for affixing bearing hoops on the outer surface of a barking drum or another similar large diameter drum, said bearing hoops resting on carrier wheels thereunder, by the aid of which the drum is rotated, in which procedure the drum is provided with an open longitudinal seam, the bearing hoops and the carrier wheels are initially properly positioned with reference to each other.

The invention concerns particularly barking drums, but it may also be applied to other large diameter drums used for instance in the concrete, lime, cellulose and metallurgic industries. Drums such as these are characterized by a massive construction, in which the diameter may be 3 to 6 meters, the length 25 to 40 meters and the thickness of the drum shell 30 to 60 millimeters.

In drums of this type, the affixing of the bearing hoops to the drum shell has caused great difficulties. The shifting stress and deformation wave caused by the rotational movement of the drum and by the carrier wheels has given rise to fatigue problems concerning the attachment in those problem solutions that have been applied. This has occurred in the case both of bolted and welded bearing hoops, in which in both instances there is produced a destructive pulsating tension load acting on the juncture between the drum and the bearing hoop. As a result of such pulsating loads, bolts can break and welded joints crack open. These prior art methods of attachment have the further drawback of poor contact between the bearing hoop and the carrier wheel.

Bearing hoops have also been affixed by means of wedging, the wedges being driven in between the bearing hoop and the drum. This procedure has the advantage of a good contact surface between the wheels and the hoop, but its essential drawback is loosening of the wedges in the course of time.

SUMMARY OF INVENTION

The object of the present invention is to provide an entirely novel procedure for affixing bearing hoops on the outer surface of a large diameter drums in which the drawbacks mentioned in the foregoing are not encountered.

The invention is characterized in that hollow bearing hoops are provided encircling the drum and through which hoops a heating fluid such as hot water is caused to flow and that the inner surface of the drum is cooled by the aid of a cooling fluid such as cold water. The drum is loaded mechanically in a direction such as to dilate and expand the longitudinal joint gap therein, that is, so that the drum is urged against the inner surface of the bearing hoops. The drum is secured in this position by the aid of wedges driven into the longitudinal joint gap, that into the longitudinal joint gap of the drum are welded inserts, and that thereafter the bearing hoops are allowed to cool down.

By the aid of the invention, a number of advantages related to drum manufacturing and hoop mounting technology are gained. The manufacturing tolerances in the bending of the drum shell to have circular cross section are wide. The hoop mounting is simply accomplished. Excellent contact is obtained between the bearing hoop and the carrier wheels because the procedure enables the hoops to be mounted in conformity with the carrier wheels. Between the drum and the bearing hoop a juncture reliable in operation is obtained, providing adequate clamping force at every point and under all and any load conditions.

According to an advantageous embodiment of the invention, heating fluid is conducted into each bearing hoop and out therefrom at two or more points. In this manner, uniform heating of the bearing hoop is achieved. If there are two heating fluid feeding points and likewise two exit points for each hoop, it is to advantage to place the feeding points of the heating fluid diametrally opposite each other with reference to the bearing hoop, and to place the heating fluid exit points likewise diametrally opposite each other. The diameter of the drum connecting the feeding points for each drum is then at right angles to the diameter of the drum connecting the exit points.

According to one embodiment of the invention, the inner surface of the drum is cooled by the aid of cooling fluid jets. Preferably, this is accomplished in that on the axis of the drum is provided a pipe from which the cooling fluid squirts radially in different directions.

After the temperature difference between the drum and the bearing hoops has become adequate, the shell of the drum is mechanically loaded in a direction such as to dilate and expand the longitudinal joint gap, preferably by the aid of pressure cylinders. Each pressure cylinder may for instance be of the type that to its piston rod have been connected two linkage arms, with their opposite ends so connected on different sides of the longitudinal joint that they produce a force component dilating the longitudinal joint gap. This design is advantageous owing to its simplicity.

According to one embodiment of the invention, the wedges to be entered in the longitudinal joint are placed on both sides of the bearing hoop. In this manner, uniform loading is attained in the direction dilating the longitudinal joint gap.

The inserts to be welded into the longitudinal joint are at least placed adjacent to each bearing hoop, because the drum is subject to highest loading at these points.

The cooling of the bearing hoops may simply be so arranged that the supply of heating fluid into the bearing hoops is discontinued. On the other hand, the cooling may be accelerated in that cooling fluid is conducted therethrough.

Owing to the large size of the drum, the affixing of the bearing hoops is a very exacting task. The drum heating and cooling must take place in a closely controlled and uniform manner in order to ensure a good end result. This task cannot at all be compared with making shrink joints known in themselves, and used in mounting sleeves and rings e.g. on a shaft.

BRIEF DESCRIPTION OF DRAWINGS

The invention is described in the following by referring to the drawing attached, wherein.

DESCRIPTION OF INVENTION

Figure 1:
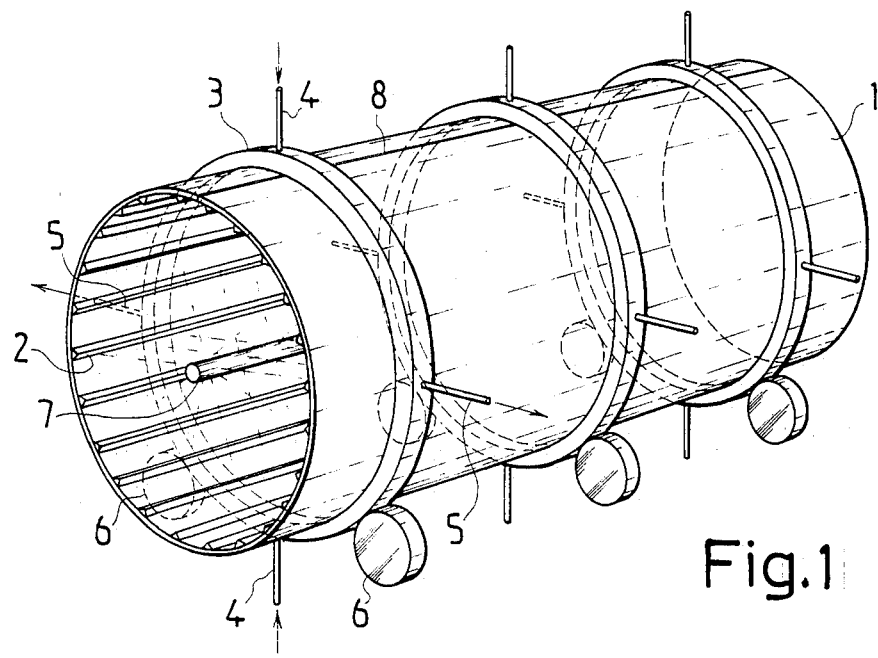
FIG. 1 presents in axonometric perspective view, a barking drum with its bearing hoops and carrier wheels at the step when the drum is being cooled and the bearing hoops are heated.

In the drawings, the reference numeral 1 refers to the barking drum, the diameter of which is for instance 5 m and the length 30 m. The inner surface of the barking drum is provided with axial strips 2 which, when the barking drum is in use, catch the timber blocks within the drum and efficiently set them in such motion against each other that the bark is rubbed off the blocks. The barking drum 1 is encircled by three bearing hoops 3, which are at this stage not yet affixed to the barking drum. The bearing hoops 3 are hollow. To each bearing hoop 3 are connected two pipes 4, located diametrically opposite each other for introducing a heating fluid, such as hot water, into the bearing hoop. Moreover, to each bearing hoop 3 are also connected two pipes 5, likewise diametrically opposed, for carrying the heating fluid out from the bearing hoop. Each bearing hoop 3 rests on two carrier wheels 6, by the aid of which the drum 1 is rotated when the barking drum is in operation. On the longitudinal axis of the drum 1 a pipe 7 is provided, from which a cooling fluid, such as cold water, is jetted onto the inner surface of the drum from nozzles on this pipe. The drum 1 has an open longitudinal joint gap 8, in the case depicted in FIG. 1 being located in the upper part of the drum.

In the position depicted in FIG. 1, the bearing hoops 3 and the carrier wheels 6 are in proper register. The bearing hoops 3 have not yet been affixed to the drum 1. Such affixing of the bearing hoops is accomplished by running hot water through the pipes 4 into the bearing hoops 3, this water exiting through the pipes 5. This heating causes the bearing hoops 3 to expand. Simultaneously, cold water is supplied onto the inner surface of the drum 1 through the pipe 7, whereby the drum 1 shrinks. Thereafter, the drum 1 is mechanically loaded in a direction such as to dilate and expand the longitudinal joint gap 8, that is, so that the shell of the drum is urged against the inner surface of the bearing hoops. This loading is effected by the aid of a pressure cylinder 9.

Figure 2:
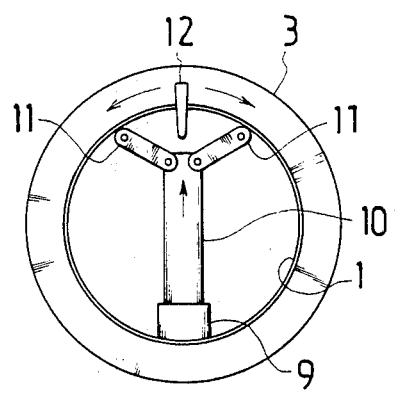
FIG. 2 presents, viewed from the end, the barking drum at another step of the procedure of the invention.
Figure 3:
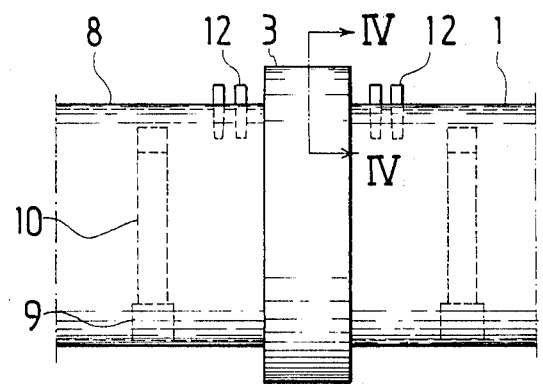
FIG. 3 shows the barking drum in elevational side view at the same step as in FIG. 2.
Figure 4:
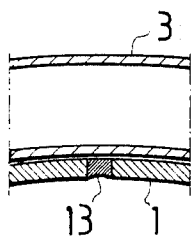
FIG. 4 shows the section along the line IV-IV in FIG. 3.

As shown in FIGS. 2 and 3, with the piston rod 10 extending from each pressure cylinder 9 there are connected two linkage arms 11. The outer ends of arms 11 are so connected on different sides of the longitudinal joint gap 8 that they give rise to a force component dilating the longitudinal joint gap. The drum 1 is secured in this dilated position by the aid of wedges 12 pushed into the longitudinal joint 8 and placed on both sides of each bearing hoop 3. Thereafter, inserts 13 are welded into the open longitudinal joint 8 of the drum 1, as shown in FIG. 4. The inserts 13 are welded into the open longitudinal joint at a suitable spacing. It is in any case advantageous to weld the inserts 13 at least at the location of each bearing hoop 3. Thereafter, the temperatures of the bearing hoops 3 and of the drum 1 are allowed to equalize. The cooling of the bearing hoops 3 may be accelerated by conducting cooling fluid therethrough. Before equalizing the temperatures, the wedges 12 are removed. After the temperatures of the drum and hoops have levelled out, the remaining portions of open longitudinal joint 8 are welded closed. The pipes 4 and 5 are then removed from the bearing hoops 3.

It is obvious to a person skilled in the art that various embodiments of the present invention may vary within the claims stated below. For instance, it is possible to use for heating and cooling fluid for the bearing hoops 3 and for the drum 1, even a flowing fluid other than water.

As shown in the FIG. 1 drawing, the drum 1 is encircled by three bearing hoops 3. The number of bearing hoops 3 may, however, vary depending on the length of the drum 1 and on those loads to which the drum will be subjected.

It has been said in the foregoing that the wedges 12 are pushed into the open longitudinal joint 8 of the drum 1 and the inserts 13 are welded in their places while the temperature difference is at its maximum between the bearing hoops 3 and the drum 1. This need not necessarily be so. In the case of drums with a diameter of several meters and a length of tens of meters, the work must be carried out with great care and in a controlled manner. It is therefore occasionally indicated to proceed so that the temperatures are first allowed to become somewhat equalized before the inserts 13 are welded in place. Also, additional wedges 12 than have been indicated in the drawing may be placed in the open longitudinal joint 8 of the drum 1 in order that the drum might assume the closest cylindrical shape as possible.

We claim:

1. A procedure for affixing bearing hoops to the outer surface of a large diameter drum, so that said bearing hoops rest on carrier wheels thereunder and by the aid of which wheels the drum is rotated, said procedure comprising:

providing at least two hollow bearing hoops encircling a drum having an open longitudinal joint gap, the bearing hoops and the carrier wheels being placed in proper register with each other;

flowing a heating fluid through said hollow bearing hoops to warm and expand the hoops;

cooling the inner surface of the drum with a cooling fluid flowing from a centrally disposed pipe within the drum to cool and shrink the drum;

mechanically loading the drum in a direction such as to dilate the longitudinal joint gap, so that the drum is urged against the inner surface of the bearing hoops;

securing the drum in this dilated position by the aid of wedges pushed into the longitudinal joint gap;

welding inserts into the open longitudinal joint of the drum; and then stopping the flow of heating fluid to the bearing hoops and allowing the hoops to cool and become affixed onto the drum.

2. A procedure according to claim 1, wherein the heating fluid is conducted into each bearing hoop and out from each hoop at two or more points.

3. A procedure according to claim 2, wherein the heating fluid introduction points are oppositely diametrically placed on each hollow bearing hoop and the heating fluid exit points are likewise positioned diametrically opposite each other between the fluid introduction points.

4. A procedure according to claim 1, wherein the inner surface of the drum is cooled by the aid of cooling fluid from jets.

5. A procedure according to claim 4, wherein on the axis of the drum a pipe is provided from which the cooling fluid jets radially in different direction against the drum inner surface.

6. A procedure according to claim 1, wherein the drum is mechanically loaded in a direction such as to dilate the longitudinal joint by the aid of at least one pressure cylinder.

7. A procedure according to claim 6, wherein each pressure cylinder has a piston rod to which two linkage arms are connected, with their opposed ends connected on different sides of the longitudinal joint, so that the linkage arms produce a force component dilating the drum longitudinal joint gap.

8. A procedure according to claim 1, wherein the wedges pushed into the longitudinal joint gap are placed on both sides of the bearing hoop.

9. A procedure according to claim 1, wherein the inserts are welded into the longitudinal joint at least adjacent to the bearing hoops.

10. A procedure according to claim 1, wherein the cooling of the bearing hoops is accelerated by conducting cooling fluid therethrough.

11. A procedure for affixing bearing hoops to the outer surface of a large diameter drum, so that said bearing hoops rest on carrier wheels thereunder and by the aid of which wheels the drum is rotated, said procedure comprising:

providing at least two hollow bearing hoops encircling a drum having an open longitudinal joint gap, the bearing hoops and the carrier wheels being placed in proper register with each other;

flowing a heating fluid through each of said hollow bearing hoops to warm and radially expand the hoops;

cooling the inner surface of the drum with a cooling fluid flowing from a centrally disposed pipe within the drum and jetting against the drum inner surface to cool and shrink the drum;

mechanically loading the drum in a direction such as to dilate the longitudinal joint gap by a pressure cylinder located diametrically within the drum, so that the drum is urged outwardly against the inner surface of the expanded bearing hoops;

securing the drum in this dilated position by pushing wedges into the longitudinal joint gap on both sides of each bearing hoop;

welding inserts into the open longitudinal joint of the cooled drum; and then stopping the flow of heating fluid to the bearing hoops and allowing the hoops to cool and thereby become affixed rigidly onto the drum.

* * * * *

UNITED STATES PATENT AND TRADEMARK OFFICE
CERTIFICATE OF CORRECTION

PATENT NO. : 4,576,327

DATED : March 18, 1986

INVENTOR(S) : Matti KAHILAHTI, Keijo VENTOLA, Matti VIRTANEN and Pentti HUHTA

It is certified that error appears in the above-identified patent and that said Letters Patent is hereby corrected as shown below:

At the title page, the first named inventor should read as

MATTI KAHILAHTI instead of MATTI KAHILATHI.

Signed and Sealed this

Twelfth Day of August 1986

[SEAL]

Attest:

Attesting Officer

DONALD J. QUIGG

Commissioner of Patents and Trademarks